United States Patent
Jiang (10) Patent No.: US 11,078,118 B2
(45) Date of Patent: Aug. 3, 2021

(54) ENERGY-SAVING BUILDING SYSTEM USING POROUS SILICATE MATERIAL FOR THERMAL INSULATION

(71) Applicant: Haihong Jiang, Beijing (CN)

(72) Inventor: Haihong Jiang, Beijing (CN)

(73) Assignee: Haihong Jiang, Plano, TX (US)

( * ) Notice: Subject to any disclaimer, the term of this patent is extended or adjusted under 35 U.S.C. 154(b) by 0 days.

(21) Appl. No.: 17/079,504

(22) Filed: Oct. 25, 2020

(65) Prior Publication Data

US 2021/0039996 A1 Feb. 11, 2021

Related U.S. Application Data

(63) Continuation of application No. PCT/CN2019/075586, filed on Feb. 20, 2019.

(30) Foreign Application Priority Data

Jun. 11, 2018 (CN) .......................... 201810596148.4

(51) Int. Cl.
  *E04B 7/04* (2006.01)
  *C04B 28/06* (2006.01)
  (Continued)

(52) U.S. Cl.
  CPC ............ *C04B 28/06* (2013.01); *C04B 18/027* (2013.01); *C04B 22/124* (2013.01);
  (Continued)

(58) Field of Classification Search
  None
  See application file for complete search history.

(56) References Cited

U.S. PATENT DOCUMENTS

| 4,904,709 A * | 2/1990 | Hermele | ................. C04B 14/30 106/15.05 |
|---|---|---|---|
| 9,115,498 B2 | 8/2015 | Shiao et al. | |
| 9,321,243 B2 | 4/2016 | Fernando et al. | |
| 10,697,174 B1 | 6/2020 | Bomberg, Jr. | |
| 2006/0201090 A1* | 9/2006 | Guevara | ................. C04B 16/08 52/309.12 |

(Continued)

FOREIGN PATENT DOCUMENTS

| CN | 103147581 A | 6/2013 |
|---|---|---|
| CN | 106284763 A | 1/2017 |

(Continued)

OTHER PUBLICATIONS

Internation Search Report of PCT/CN2019/075586, dated Apr. 29, 2019.

*Primary Examiner* — Basil S Katcheves (57) ABSTRACT

An energy-saving building system using a porous silicate material for thermal insulation, comprises a foundation, a retaining wall body, and a roof system. The foundation comprises a ground ring beam and columns, and a porous silicate thermal insulation material is cast around the ground ring beam and the columns; the porous silicate thermal insulation material is composed of an organic lightweight aggregate and a lightweight inorganic matrix, and the lightweight inorganic matrix is provided thereon with a plurality of micropores; the retaining wall body comprises an outer wall disposed on the ground ring beam, the outer wall comprises an outer side support body, an inner side support body, and the porous silicate thermal insulation material cast between the inner and outer side support bodies, and the outer side support body and the inner side support body are connected therebetween by means of a heat insulating connection member.

10 Claims, 7 Drawing Sheets

(51) Int. Cl.

| | |
|---|---|
| *C04B 18/02* | (2006.01) |
| *C04B 22/12* | (2006.01) |
| *C04B 24/12* | (2006.01) |
| *C04B 24/32* | (2006.01) |
| *E04B 1/76* | (2006.01) |
| *E04B 1/78* | (2006.01) |
| *E04B 2/00* | (2006.01) |
| *E04B 5/00* | (2006.01) |
| *E04B 7/00* | (2006.01) |
| *C04B 111/40* | (2006.01) |
| *E04B 1/74* | (2006.01) |

(52) U.S. Cl.
CPC ............ *C04B 24/124* (2013.01); *C04B 24/32* (2013.01); *E04B 1/7604* (2013.01); *E04B 1/78* (2013.01); *E04B 2/00* (2013.01); *E04B 5/00* (2013.01); *E04B 7/00* (2013.01); *C04B 2111/40* (2013.01); *C04B 2201/30* (2013.01); *E04B 2001/742* (2013.01)

(56) References Cited

U.S. PATENT DOCUMENTS

| | | | |
|---|---|---|---|
| 2014/0000204 A1* | 1/2014 | Wu | E04B 2/02 |
| | | | 52/506.05 |
| 2014/0175320 A1* | 6/2014 | Thomas | E04B 1/82 |
| | | | 252/62 |
| 2014/0260034 A1* | 9/2014 | Ciuperca | E04C 2/288 |
| | | | 52/405.3 |

FOREIGN PATENT DOCUMENTS

| | | |
|---|---|---|
| CN | 206512867 U | 9/2017 |
| CN | 107524239 A | 12/2017 |
| CN | 107780558 A | 3/2018 |
| CN | 107975144 A | 5/2018 |
| CN | 207392817 U | 5/2018 |
| CN | 108487452 A | 9/2018 |
| CN | 208486361 U | 2/2019 |
| DE | 102009040531 A1 | 3/2010 |
| WO | 2008047133 A1 | 4/2008 |

\* cited by examiner

ENERGY-SAVING BUILDING SYSTEM USING POROUS SILICATE MATERIAL FOR THERMAL INSULATION

CROSS-REFERENCE TO RELATED APPLICATIONS

This application is a continuation of International Patent Application No. PCT/CN2019/075586 with a filing date of Feb. 20, 2019, designating the United States, and further claims priority to Chinese Patent Application No. 201810596148.4 with a filing date of Jun. 11, 2018. The content of the aforementioned applications, including any intervening amendments thereto, are incorporated herein by reference.

TECHNICAL FIELD

The present invention relates generally to a field of energy-saving buildings, and more particularly to an energy-saving building system using porous silicate material for thermal insulation.

BACKGROUND OF THE PRESENT INVENTION

Modern energy-saving houses, particularly circumferential walls, roofs, and foundations of low energy consumption, are necessarily treated for severe thermal insulation. What is currently available in the market is B class organic foam materials that are not resistant to fire, such as polystyrene sheet organic foam and mineral wool. Polystyrene sheet organic foam has drawbacks of being flammable, having potential risk of fire, and property instability for long-term durability, and easily cause problems of sinking of foundation, detachment of thermal insulation layers, water penetration and icing and dewing on roofs. Mineral wool easily absorb moisture and deform. The compressive strength of porous silicate thermal insulation material may greatly lower with the drop of temperature in the low temperature of wintertime.

A modern building system includes a foundation, a retaining wall body, and a roof. Differentiation of thermal conductivity in each part of the building may easily cause a heat bridge effect and the modern building structure may alleviate the heat bridge effect, but is not good for completely eliminating such a problem.

SUMMARY OF PRESENT INVENTION

Technical Problems

In view of the above problems, the present invention provides a novel energy-saving building system using porous silicate material for thermal insulation. The energy-saving building system using porous silicate material for thermal insulation has an outer wall that adopts a bridge-cut connection to greatly enhance thermal insulation property of the outer wall in order to effectively dissolve the issue of heat bridge effect.

Technical Solutions

A specific technical solution of the present invention is as follows:

The present invention provides an energy-saving building system using porous silicate material for thermal insulation, which comprises a foundation, a retaining wall body, and a roof system. The foundation comprises a ground ring beam and columns disposed on the ground ring beam. A porous silicate thermal insulation material is cast around the ground ring beam and the columns.

The porous silicate thermal insulation material is formed of an organic lightweight aggregate and a lightweight inorganic matrix. The organic lightweight aggregate is arranged in an interior of the lightweight inorganic matrix. The lightweight inorganic matrix is formed with a plurality of micropores.

The retaining wall body comprises an outer wall disposed on the ground ring beam. The outer wall is formed of an outer side support body, an inner side support body, and a porous silicate thermal insulation material cast between the outer side support body and the inner side support body. The outer side support body and the inner side support body are connected by a heat insulating connection member arranged therebetween.

The roof system comprises a roof support beam disposed atop the outer wall and a base layer roof panel disposed on the roof support beam. A porous silicate thermal insulation material is cast around the base layer roof panel. The porous silicate thermal insulation material cast around the base layer roof panel is connected with the porous silicate thermal insulation material cast between the outer side support body and the inner side support body.

A porous silicate thermal insulation material is cast on an annular intersection between an outer side of the outer wall and the foundation.

In further improvement, the ground ring beam comprises an outer supporting ring beam and an inner supporting ring beam arranged inside the outer supporting ring beam. A gap is formed between the inner supporting ring beam and the outer supporting ring beam and filled up with the porous silicate thermal insulation material. The base layer roof panel comprises an inner ring and an outer ring arranged at one side of the inner ring. The inner ring and the outer ring are connected by a connecting member arranged therebetween. The inner side support body has a lower end disposed on the inner supporting ring beam and an upper end extending through the porous silicate thermal insulation material to connect to the inner ring. The outer side support body has a lower end disposed on the outer supporting ring beam and an upper end extending through the porous silicate thermal insulation material to connect to the outer ring.

In further improvement, the inner side support body has a lower end disposed on the ground ring beam and an upper end extending through the porous silicate thermal insulation material to be fixed to the base layer roof panel. A channel steel is fixedly connected to an outer side of the ground ring beam by a spacing support beam or a bridge-cut bolt. The outer side support body has a lower end fixed to the channel steel and an upper end fixed to a separately supported eaves or balcony.

In further improvement, the ground ring beam is directly constructed on a sand/gravel base and a bottom of the ground ring beam and a top of the ground ring beam, with a part thereof connected with the columns being excluded, are provided with the porous silicate thermal insulation material.

In further improvement, the foundation further comprises support pillars formed on a sand/gravel base to support the ground ring beam. The support pillars are ring beam legs or separate pillars. A top of the ground ring beam, with a part thereof connected with the columns being excluded, side surfaces of the support pillars, and a bottom of the ground ring beam), with a part thereof connected with the support pillars being excluded, are provided with the porous silicate thermal insulation material.

In further improvement, the outer wall is mounted with an external door/window frame for mounting an internal door/window frame. The external door/window frame is formed as being circumferentially surrounded by four heat insulating plates that are fixed to the porous silicate thermal insulation material. Each of the heat insulating plates (61) and two opposite end faces of the external door/window frame is provided with two waterproof plastic rubber strip layers for fixing the external door/window frame. The two waterproof plastic rubber strip layers, the external door/window frame, and the internal door/window frame define therebetween a hollow compartment. Each of the heat insulating plates is formed with a circular hole in communication with the hollow compartment. The hollow compartment and the circular hole are filled up with a porous silicate thermal insulation material.

In further improvement, the lightweight inorganic matrix is mainly formed of ingredient materials having the following parts of weight:

| | |
|---|---|
| calcium silicate | 20-30, |
| aluminum silicate | 10-20, |
| calcium chloride | 5-10, |
| dodecyl polyoxyethylene ether | 2-8, and |
| stearic palmitamide | 5-10. |

In further improvement, the organic lightweight aggregate comprises ingredients having the following parts of weight:

| | |
|---|---|
| talc powder | 25-35, |
| bentonite | 5-10, |
| calcium stearate | 15-20, |
| polystyrene foam particle | 20-40, and |
| water-soluble acrylic acid resin | 0.1-1. |

In further improvement, a method for manufacturing the lightweight inorganic matrix comprises the following steps:

S1: providing 5-10 parts of weight of calcium chloride, 2-8 parts of weight of dodecyl polyoxyethylene ether, and 5-10 parts of weight of stearic palmitamide, adding water of two times of the parts of weight, stirring with a stirrer at a rotational speed of 20-100 r/min to form a porous foam; and S2: uniformly mixing 10-20 parts of weight of aluminum silicate and 20-30 parts of weight of calcium silicate with the porous foam formed in step S1, adding water of 20-30 parts of weight and stirring at a speed of 20-100 r/min for 5-10 min for expanding and foaming in room temperature for 1-10 min to obtain the lightweight inorganic matrix.

In further improvement, a method for manufacturing the organic lightweight aggregate comprises the following steps:

S3: placing 25-35 parts of weight of talc powder and 15-20 parts of weight of calcium stearate in a stirring container, adding 5-10 parts of weight of bentonite for stirring at a rotational speed of 20-100 r/min for 5-15 min to obtain a mixed suspending substance, placing polystyrene foam particles of 0.5 times of the formulated parts of weight in the stirring container, with stirring being continued at the rotational speed of 20-100 r/min for 1-10 min, taking out the so-mixed polystyrene foam particles and placing in a baking oven at 40-50° C. for drying for 10-20 min to obtain polyethylene foam particles covered with the mixed suspending substance; and S4: placing remaining parts of weight of polystyrene foam particle and the polyethylene foam particles that are covered with the mixed suspending substance obtained in step S3 in an open container, dissolving 0.1-1 parts of weight of water-soluble acrylic acid resin in 0.05-0.5 parts of weight to form an acrylic acid resin solution, spraying the acrylic acid resin solution, in the form of a mist, at a stirring condition of 20-100 r/min, into the open container, rising temperature to 80-90° C., continuing stirring for 15-25 min, and then placing in an airflow dryer for treatment for 30 min, with temperature being set at 100° C., to obtain the organic lightweight aggregate.

Benefit Effect

The present invention provides a novel energy-saving building system using porous silicate material for thermal insulation, in which the outer wall is formed of an outer side support body, an inner side support body, and a porous silicate thermal insulation material cast between the outer side support body and the inner side support body. Such an outer wall that adopts the so-call bridge-cut connection could greatly enhance thermal insulation performance of a building. Further, the porous silicate thermal insulation material is provided on the foundation, the roof system, connection between the foundation and the outer wall, and connection between the outer wall and the roof system, and such an arrangement provides a high strength and good resistance against weather and freezing-thawing cycle, and also has excellent property of fire resistance to completely eliminate potential risks of fire catastrophe during constructing and entire service life, and also features being not absorbing moisture and no efflorescence, being free of foundation sinking and cracking, being environment-friendly and safe, being of no odor, having good property of thermal insulation, and also effectively removing heat bridges.

PREFERRED EMBODIMENTS OF THE INVENTION

The present invention will be described in a more detailed manner with reference to the drawings and embodiments provided below.

Embodiment 1

Figure 1:
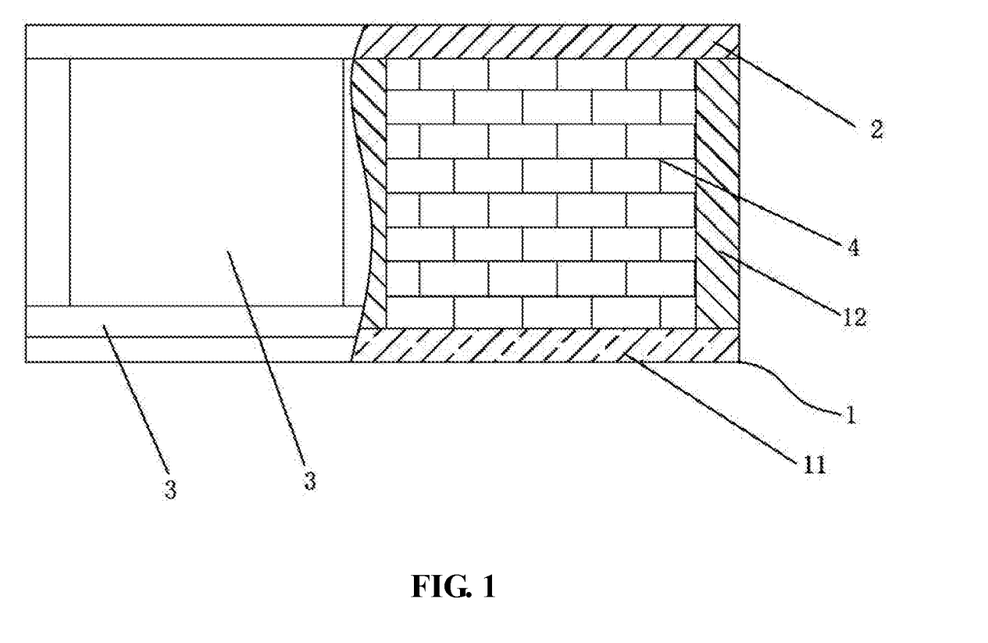
FIG. 1 is a schematic view of a structure of an energy-saving building system using porous silicate material for thermal insulation according to Embodiment 1.
Figure 2:
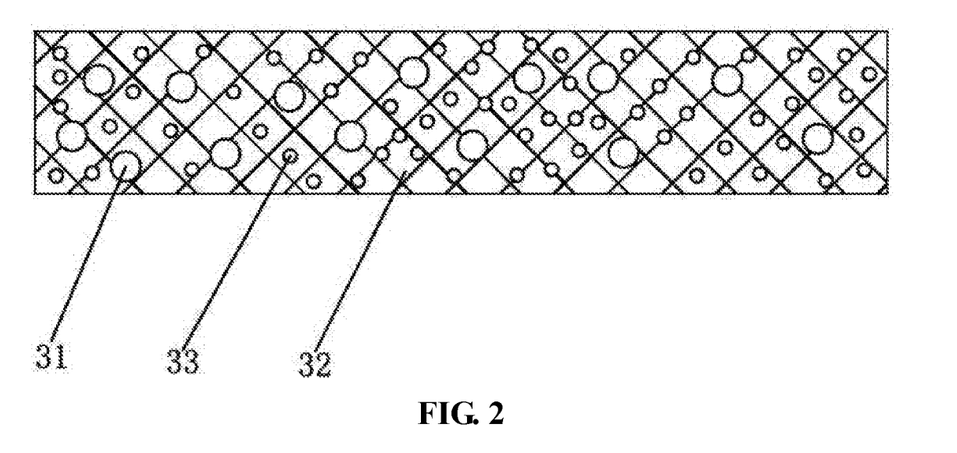
FIG. 2 is a schematic view of a structure of a porous silicate thermal insulation material according to Embodiment 1.
Figure 3:
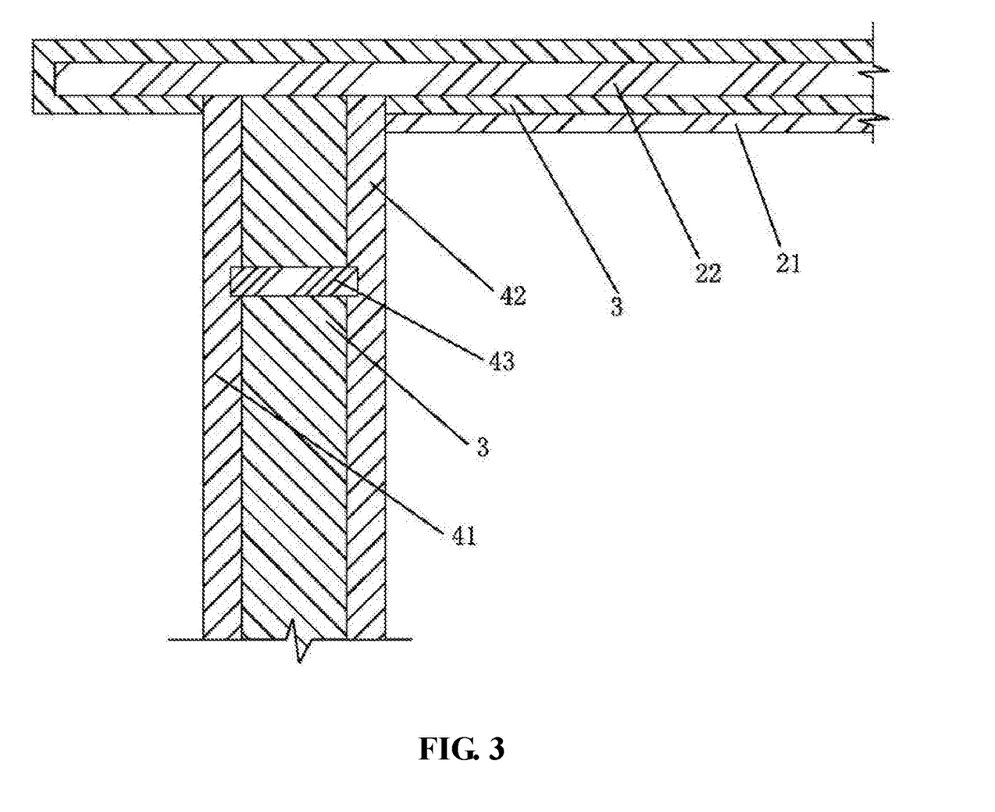
FIG. 3 is a side elevational view of the energy-saving building system using porous silicate material for thermal insulation according to Embodiment 1.

Embodiment 1 of the present invention provides an energy-saving building system using porous silicate material for thermal insulation, which, as shown in FIGS. 1, 2, and 3, comprises a foundation 1, a retaining wall body, and a roof system 2. The foundation 1 comprises a ground ring beam 11 and columns 12 disposed on the ground ring beam 11. A porous silicate thermal insulation material 3 is cast around the ground ring beam 11 and the columns 12.

The porous silicate thermal insulation material 3 is formed of an organic lightweight aggregate 31 and a lightweight inorganic matrix 32. The organic lightweight aggregate 31 is arranged in interior of the lightweight inorganic matrix 32, and the lightweight inorganic matrix 32 is provided with a plurality of micropores 33.

The retaining wall body comprises an outer wall 4 disposed on the ground ring beam 11. The outer wall 4 is formed of an outer side support body 41, an inner side support body 42, and a porous silicate thermal insulation material 3 cast between the outer side support body 41 and the inner side support body 42. The outer side support body 41 and the inner side support body 42 are connected by means of a heat insulating connection member 43 therebetween.

The roof system 2 comprises a roof support beam 21 disposed atop the outer wall 4 and a base layer roof panel 22 disposed on the roof support beam 21. A porous silicate thermal insulation material 3 is cast around the base layer roof panel 22, and the porous silicate thermal insulation material 3 cast around the base layer roof panel 22 is connected with the porous silicate thermal insulation material 3 cast between the outer side support body 41 and the inner side support body 42.

A porous silicate thermal insulation material 3 is cast on an annular intersection between an outer side of the outer wall 4 and the foundation 1.

The present invention provides a novel energy-saving building system using porous silicate material for thermal insulation, in which the outer wall is formed of an outer side support body, an inner side support body, and a porous silicate thermal insulation material cast between the outer side support body and the inner side support body. Such an outer wall that adopts the so-call bridge-cut connection could greatly enhance thermal insulation performance of a building. Further, the porous silicate thermal insulation material is provided on the foundation, the roof system, connection between the foundation and the outer wall, and connection between the outer wall and the roof system, and such an arrangement provides a high strength and good resistance against weather and freezing-thawing cycle, and also has excellent property of fire resistance to completely eliminate potential risks of fire catastrophe during constructing and entire service life, and also features being not absorbing moisture and no efflorescence, being free of foundation sinking and cracking, being environment-friendly and safe, being of no odor, having good property of thermal insulation, and also effectively removing heat bridges.

In the present invention, the outer side support body and the inner side support body can both be channels, structured columns, and the structured columns can be square columns, and the square columns are filled, in the interior thereof, with the porous silicate thermal insulation material.

Further, due to being formed of the outer side support body, the inner side support body, and the porous silicate thermal insulation material cast between the outer side support body and the inner side support body, the outer wall makes a self-insulating wall and there is no need to construct additional thermal insulation, making a great reduction of the overall building cost.

The porous silicate thermal insulation material is cast in the form of a flowable paste to effectively enclose and fill up the ground ring beam, periphery of the columns, and any preserved space and gaps for pipe lines, to achieve good thermal insulation and effectively remove heat bridges, and provide effective thermally-isolating enclosure of the ground ring beam and the columns for making an excellent effect of thermal insulation for the base foundation. The porous silicate thermal insulation material may be further cast on indoor concrete paving.

The outer side support body and the inner side support body are both channels or structured columns, wherein inside and outside surfaces of the outer wall are both mounted with various sorts of decoration boards and the outer side support body and the inner side support body are connected with the heat insulating connection member therebetween so as to eliminate heat bridge effect. The porous silicate thermal insulation material is cast, in a form of flowable paste, between the outer side support body and the inner side support body to effectively enclose and fill up structure steel beams, steel columns, and any preserved nearby space and gaps for pipe lines, to achieve good thermal insulation enclosure and effectively remove heat bridges.

Embodiment 2

Figure 4:
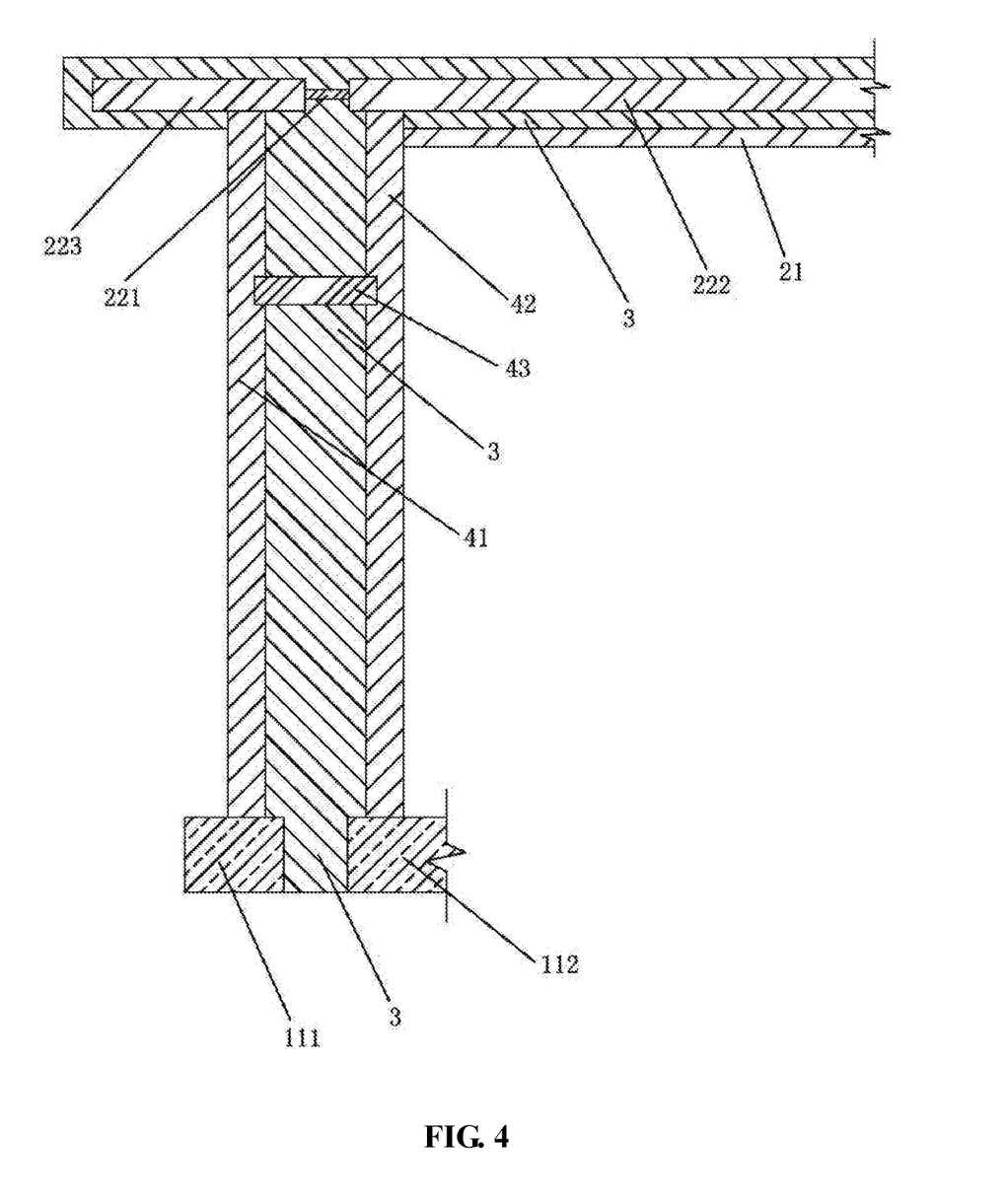
FIG. 4 is a side elevational view of the energy-saving building system using porous silicate material for thermal insulation according to Embodiment 2.

Embodiment 2 of the present invention provides an energy-saving building system using porous silicate material for thermal insulation, which is generally similar to Embodiment 1, with a difference being that, as shown in FIG. 4, the ground ring beam 11 comprises an outer supporting ring beam 11 and an inner supporting ring beam 112 arranged and fit inside the outer supporting ring beam 111. A gap is defined between the inner supporting ring beam 112 and the outer supporting ring beam 111 and is filled up with the porous silicate thermal insulation material 3. The base layer roof panel 22 comprises an inner ring 222 and an outer ring 223 arranged at one side of the inner ring 222. The inner ring 222 and the outer ring 223 are connected by means of a connecting member 221 arranged therebetween. The inner side support body 42 has a lower end disposed on the inner supporting ring beam 112 and an upper end extending through the porous silicate thermal insulation material 3 to connect to the inner ring 222. The outer side support body 41 has a lower end disposed on the outer supporting ring beam 111 and an upper end extending through the porous silicate thermal insulation material 3 to connect to the outer ring 223.

In the present invention, the ground ring beam is split into the inner supporting ring beam and the outer supporting ring beam, which respectively support the inner side support body and the outer side support body, with the porous silicate thermal insulation material filled up therebetween to eliminate or greatly reduce heat bridges in the foundation.

The base layer roof panel is split into two individual rings, which are the inner ring and the outer ring, and respectively corresponding to the inner supporting ring beam and the outer supporting ring beam. This separates inside and outside portions of an outer wall of the roof from each other so as to maximally reduce heat bridge effect, wherein the outer ring can be ancillary structure of for example eaves, balconies, rain sheds, and water trenches. The upper end of the outer side support body is connected to the outer ring. The base layer roof panel is entirely coated with the porous silicate thermal insulation paste connected with the thermal insulation layer of the outer wall to thereby form gap-free joint between the roof thermal insulation and the outer wall thermal insulation, achieving excellent continuous, gap-free thermal insulation effect between the roof and the wall body.

Pipe lines and wire lines that are necessarily mounted on the roof, such as wire lines of solar panels, must be laid on the roof base panel first before the porous silicate thermal insulation material is cast and coated on the wall body, so as to be enclosed and secured after the casting. After the thermal insulation layer is done, a mortar protective layer, a waterproof layer, and roof tiles can be laid thereon with standard construction processes. A slop roof can be constructed by completely following the above process, or alternatively, a flat roof is made first and then a slope roof can be made thereon, but a supporting part of such a slope roof may use an insulating bridge-cut connecting member.

In the present invention, the connecting member can be a thermally insulating bridge-cut connecting member or a cantilever hanger structure may be adopted.

Embodiment 3

Figure 5:
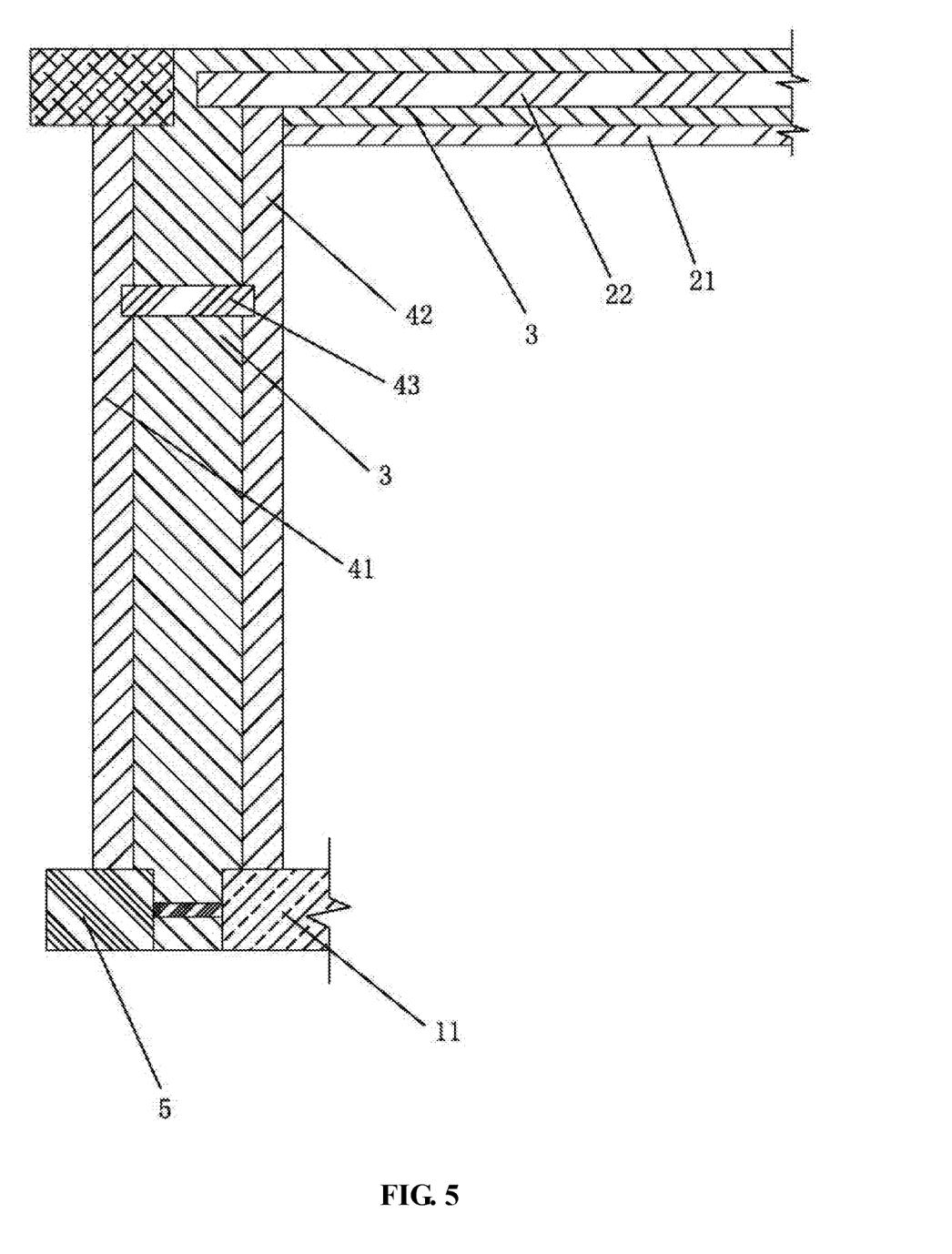
FIG. 5 is a side elevational view of the energy-saving building system using porous silicate material for thermal insulation according to Embodiment 3.

Embodiment 3 of the present invention provides an energy-saving building system using porous silicate material for thermal insulation, which is generally similar to Embodiment 1, with a difference being that, as shown in FIG. 5, the inner side support body 42 has a lower end that is disposed on the ground ring beam 11 and an upper end extending through the porous silicate thermal insulation material 3 to be fixed to the base layer roof panel 22, and a channel steel 5 is fixedly connected to an outer side of the ground ring beam 11 by means of a spacing support beam or a bridge-cut bolt. The outer side support body 41 has a lower end fixed to the channel steel 5 and an upper end fixed to a separately supported eaves or balcony.

The present invention provides an alternative way of connecting the inner side support body and the outer side support body, and in this case, there is no need to provide the inner supporting ring beam and the outer supporting ring beam, and the inner side support body is directly disposed on the ground ring beam, and a ring of channel steel is arranged outside the ground ring beam to fix the outer side support body. In case that there is an individually supported eaves or balcony, which is separate from the main structure, an upper end of an outside channel of the outer wall can be directly fixed to the eaves or balcony to avoid heat bridge in the outer wall.

Embodiment 4

Figure 6:
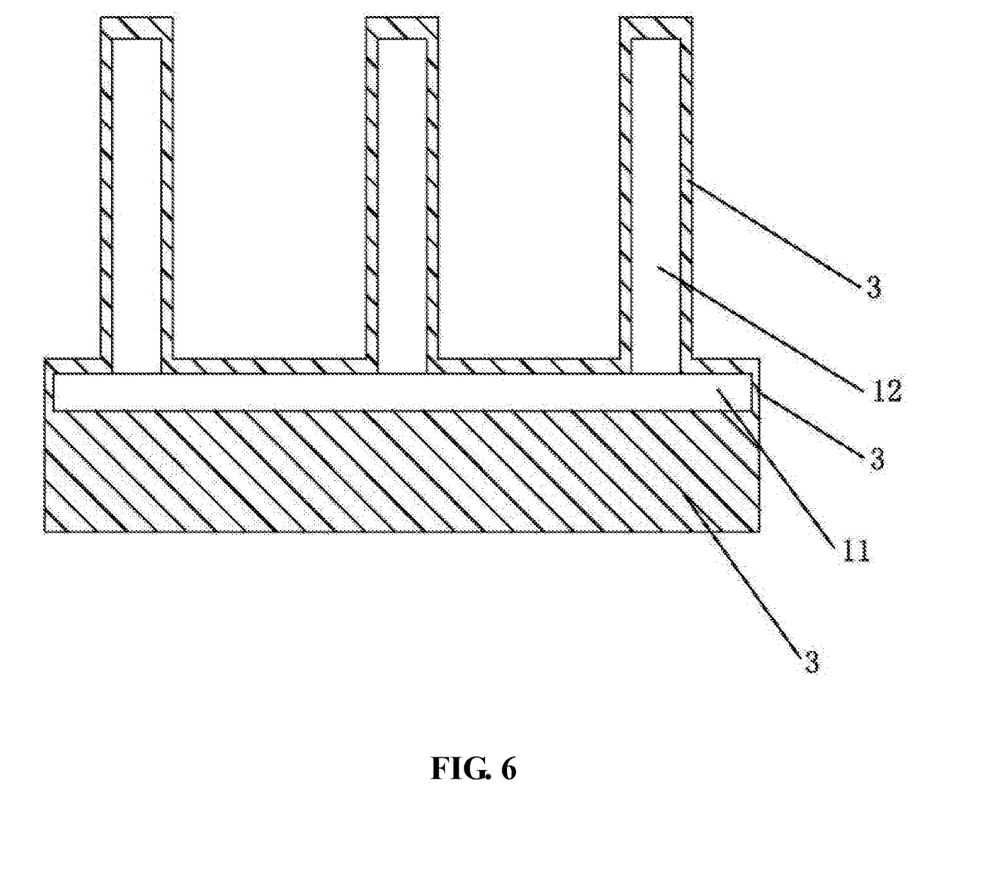
FIG. 6 is a schematic view of a structure of a foundation according to Embodiment 4.

Embodiment 4 of the present invention provides an energy-saving building system using porous silicate material for thermal insulation, which is generally similar to Embodiments 1-3, with a difference being that, as shown in FIG. 6, the ground ring beam 11 is directly constructed on a sand/gravel base and a bottom of the ground ring beam 11 and a top of the ground ring beam 11, excluding a part thereof that is connected with the columns 12, are both provided with the porous silicate thermal insulation material 3.

In the present invention, the porous silicate thermal insulation material is laid under the bottom of the ground ring beam. This can be regarded as providing a maintenance casing made of the porous silicate thermal insulation material and directly disposing the ground ring beam on the maintenance casing, and then, side surfaces of the ground ring beam, side surfaces of the columns, and the top of the ground ring beam excluding the part thereof connected with the columns, are all cast with the porous silicate thermal insulation material, so as to completely eliminate heat bridges in the foundation of the building that is located under the ground surface. This method is applicable to construction of low-level buildings.

Embodiment 5

Figure 7:
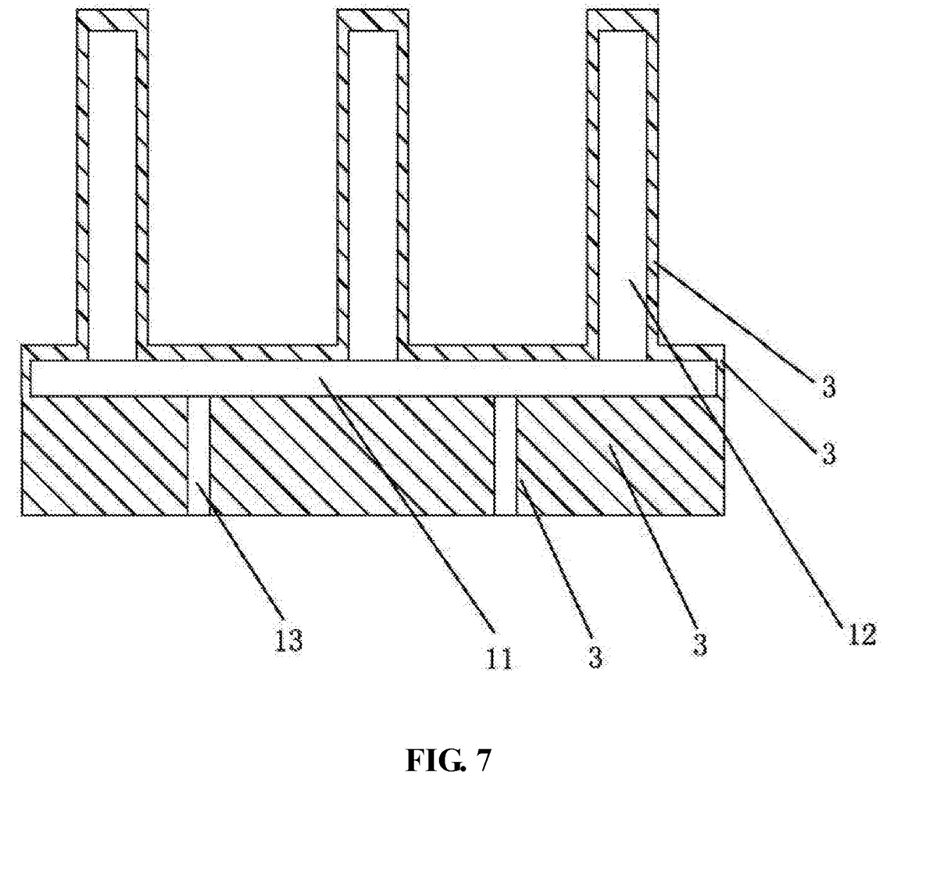
FIG. 7 is a schematic view of a structure of a foundation according to Embodiment 5.

Embodiment 5 of the present invention provides an energy-saving building system using porous silicate material for thermal insulation, which is generally similar to Embodiments 1-3, with a difference being that, as shown in FIG. 7, the foundation 1 further comprises support pillars 13 that are constructed on a sand/gravel base to support the ground ring beam 11, the support pillars 13 can be ring beam legs or separate pillars. A top of the ground ring beam 11, excluding a part thereof that is connected with the columns 12, side surfaces of the support pillars 13, and a bottom of the ground ring beam 11, excluding a part thereof that is connected with the support pillars 13, are all provided with the porous silicate thermal insulation material 3.

The present invention provides the ground ring beam being constructed on a sand/gravel base by using the support pillars and the side surfaces of the ground ring beam, side surfaces of the columns, the top of the ground ring beam excluding the part thereof connected with the columns, side surfaces of the support pillars, and a part of the bottom the ground ring beam that is suspended are all cast with the porous silicate thermal insulation material. This arrangement provides an excellent thermal insulation effect for a building foundation and greatly reduces heat bridges of the foundation. This method is applicable to construction of high-level buildings.

Embodiment 6

Figure 8:
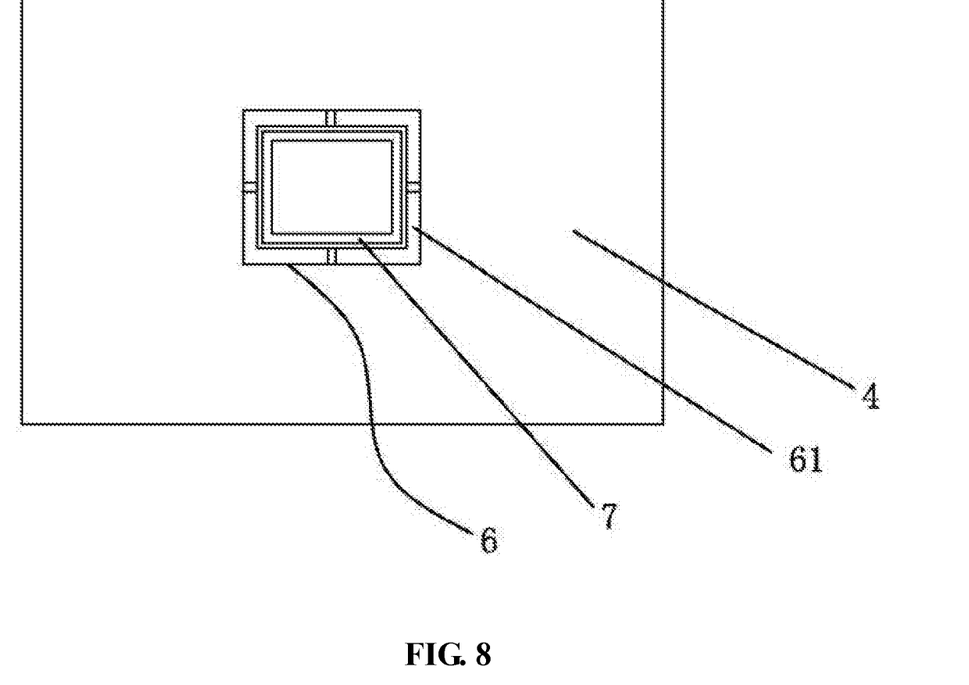
FIG. 8 is a schematic view of a structure of a door/window frame according to Embodiment 6.
Figure 9:
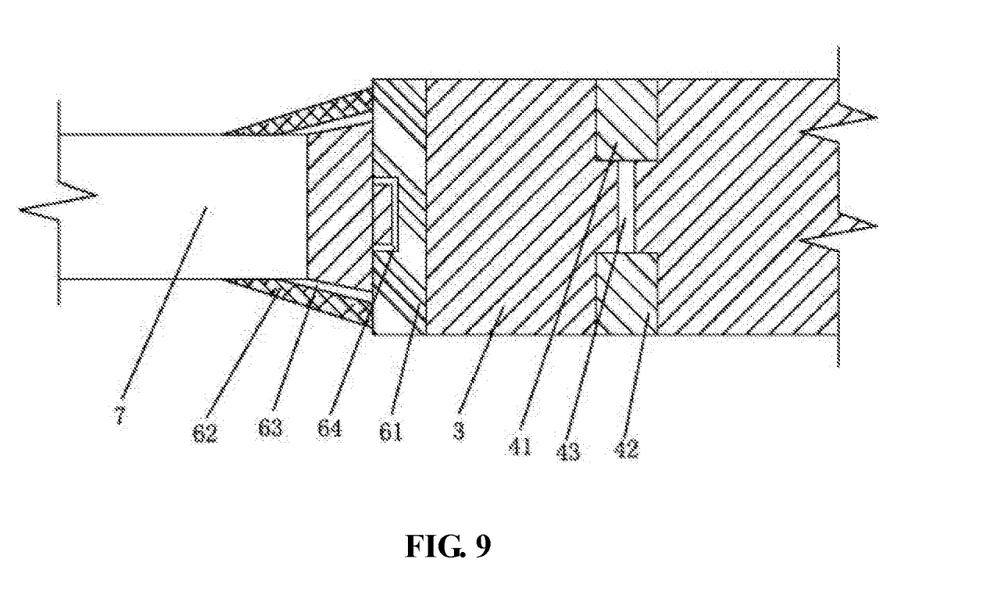
FIG. 9 is a cross-sectional view of a portion of the door/window frame according to Embodiment 6.

Embodiment 6 of the present invention provides an energy-saving building system using porous silicate material for thermal insulation, which is generally similar to Embodiment 1, with a difference being that, as shown in FIGS. 8 and 9, the outer wall 4 is mounted with an external door/window frame 6 for mounting an internal door/window frame 7. The external door/window frame 6 is formed as being circumferentially surrounded by four heat insulating plates 61 that are fixed to the porous silicate thermal insulation material 3. Each of the heat insulating plates 61 and two opposite end surfaces of the external door/window frame 6 are all provided with two waterproof plastic rubber strip layers 62 for fixing the external door/window frame 6. A hollow compartment 63 is formed among the two waterproof plastic rubber strip layers 62, the external door/window frame 6, and the internal door/window frame. Each of the heat insulating plates 61 is formed with a circular hole 64 in communication with the hollow compartment 63. Interiors of the hollow compartment 63 and the circular hole 64 are both filled up with the porous silicate thermal insulation material 3.

In the present invention, the external door/window frame is circumferentially surrounded by four heat insulating plates that are fixed to the porous silicate thermal insulation material, with a protruding part being arranged on an outdoors-facing side, the interior being the porous silicate thermal insulation material, which, with the heat insulating plates being formed with the circular holes, can fill, in a sealing manner, between the external door/window frame and the internal door/window frame upon being cast, so as to significantly enhance overall thermal insulation and water resistance of the door/window frame.

Embodiment 7

Embodiment 7 of the present invention provides an energy-saving building system using porous silicate material for thermal insulation, which is generally similar to Embodiment 1. The Embodiment provides a specific definition of the lightweight inorganic matrix and the organic lightweight aggregate. The lightweight inorganic matrix 32 is mainly formed of ingredient materials having parts of weight provided below:

| calcium silicate | 20, |
|---|---|
| aluminum silicate | 10, |
| calcium chloride | 5, |
| dodecyl polyoxyethylene ether | 2, and |
| stearic palmitamide | 5; | and
the organic lightweight aggregate 31 comprises ingredients having parts of weight provided below:

| talc powder | 25, |
|---|---|
| bentonite | 5, |
| calcium stearate | 15, |
| polystyrene foam particle | 20, and |
| water-soluble acrylic acid resin | 0.1. |

Embodiment 8

Embodiment 8 of the present invention provides an energy-saving building system using porous silicate material for thermal insulation, which is generally similar to Embodiment 1. The Embodiment provides a specific definition of the lightweight inorganic matrix and the organic lightweight aggregate. The lightweight inorganic matrix 32 is mainly formed of ingredient materials having parts of weight provided below:

| calcium silicate | 25, |
|---|---|
| aluminum silicate | 15, |
| calcium chloride | 8, |
| dodecyl polyoxyethylene ether | 5, and |
| stearic palmitamide | 8; | and
the organic lightweight aggregate 31 comprises ingredients having parts of weight provided below:

| talc powder | 30, |
|---|---|
| bentonite | 8, |
| calcium stearate | 18, |
| polystyrene foam particle | 30, and |
| water-soluble acrylic acid resin | 0.5. |

Embodiment 9

Embodiment 9 of the present invention provides an energy-saving building system using porous silicate material for thermal insulation, which is generally similar to Embodiment 1. The Embodiment provides a specific definition of the lightweight inorganic matrix and the organic lightweight aggregate. The lightweight inorganic matrix 32 is mainly formed of ingredient materials having parts of weight provided below:

| calcium silicate | 30, |
|---|---|
| aluminum silicate | 20, |
| calcium chloride | 10, |
| dodecyl polyoxyethylene ether | 8, and |
| stearic palmitamide | 10; | the organic lightweight aggregate 31 comprises ingredients having parts of weight provided below:

| talc powder | 35, |
|---|---|
| bentonit | 10, |
| calcium stearate | 20, |
| polystyrene foam particle | 40, and |
| water-soluble acrylic acid resin | 1; | and
a method for manufacturing the lightweight inorganic matrix 32 comprises the following steps:

S1: providing 10 parts of weight of calcium chloride, 8 parts of weight of dodecyl polyoxyethylene ether, and 10 parts of weight of stearic palmitamide, and adding water having two times of parts of weight, followed by stirring with a stirrer at a rotational speed of 100 r/min to form a porous foam; and S2: uniformly mixing 20 parts of weight of aluminum silicate and 30 parts of weight of calcium silicate with the porous foam formed in step S1 and adding with water of 30 parts of weight for stirring at a speed of 100 r/min for 10 min for expanding and foaming in room temperature for 10 min to obtain the lightweight inorganic matrix; and a method for manufacturing the organic lightweight aggregate 31 comprises the following steps:

S3: placing 35 parts of weight of talc powder and 20 parts of weight of calcium stearate in a stirring container and adding with 10 parts of weight of bentonite for stirring at a rotational speed of 100 r/min for 15 min to obtain a mixed suspending substance, and placing polystyrene foam particles of 0.5 times of the above-formulated parts of weight in the stirring container, with stirring being continued at the rotational speed of 100 r/min for 10 min, taking out the so-mixed polystyrene foam particles and placing in a baking oven at 50° C. for drying for 20 min to obtain polyethylene foam particles covered with the mixed suspending substance; and S4: placing remaining parts of weight of polystyrene foam particle and the polyethylene foam particles that are covered with the mixed suspending substance obtained in step S3 in an open container, dissolving 1 part of weight of water-soluble acrylic acid resin in 0.5 parts of weight of water to form an acrylic acid resin solution, and spraying the acrylic acid resin solution, in the form of a mist, at a stirring condition of 100 r/min, into the open container, rising temperature to 90° C. and continuing stirring for 25 min, and then placing in an airflow dryer for treatment for 30 min, with temperature being set at 100° C., to obtain the organic lightweight aggregate; and a method for manufacturing the porous silicate thermal insulation material 3 comprises the following step: S5: uniformly mixing the lightweight inorganic matrix obtained in step S2 and the organic lightweight aggregate obtained in step S4 to obtain the porous silicate thermal insulation material.

Embodiment 10

Embodiment 10 of the present invention provides an energy-saving building system using porous silicate material for thermal insulation, which is generally similar to Embodiment 1. The Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 20, |
| aluminum silicate | 10, |
| calcium chloride | 5, |
| dodecyl polyoxyethylene ether | 2, and |
| stearic palmitamide | 5; | the organic lightweight aggregate 31 comprises ingredients having parts of weight provided below:

| | |
|---|---|
| polystyrene foam particle | 20, and |
| water-soluble acrylic acid resin | 0.1. |

Embodiment 11

Embodiment 11 of the present invention provides an energy-saving building system using porous silicate material for thermal insulation, which is generally similar to Embodiment 1. The Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| calcium chloride | 8, |
| dodecyl polyoxyethylene ether | 5, and |
| stearic palmitamide | 8; | the organic lightweight aggregate 31 comprises ingredients having parts of weight provided below:

| | |
|---|---|
| polystyrene foam particle | 30, and |
| water-soluble acrylic acid resin | 0.5. |

Embodiment 12

Embodiment 12 of the present invention provides an energy-saving building system using porous silicate material for thermal insulation, which is generally similar to Embodiment 7. The Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 30, |
| aluminum silicate | 20, |
| calcium chloride | 10, |
| dodecyl polyoxyethylene ether | 8, and |
| stearic palmitamide | 10; | and
the organic lightweight aggregate 31 comprises ingredients having parts of weight provided below:

| | |
|---|---|
| polystyrene foam particle | 40, and |
| water-soluble acrylic acid resin | 1; | a method for manufacturing the lightweight inorganic matrix 32 comprises the following steps:

S1: providing 10 parts of weight of calcium chloride, 8 parts of weight of dodecyl polyoxyethylene ether, and 10 parts of weight of stearic palmitamide, and adding water having two times of parts of weight, followed by stirring with a stirrer at a rotational speed of 100 r/min to make a porous foam; and S2: uniformly mixing 20 parts of weight of aluminum silicate and 30 parts of weight of calcium silicate with the porous foam made in step S1 and adding with water of 30 parts of weight for stirring at a speed of 100 r/min for 10 min for expanding and foaming in room temperature for 10 min to obtain the lightweight inorganic matrix; and a method for manufacturing the organic lightweight aggregate 31 comprises the following steps:

S3: placing 35 parts of weight of talc powder and 20 parts of weight of calcium stearate in a stirring container and adding with 10 parts of weight of bentonite for stirring at a rotational speed of 100 r/min for 15 min to obtain a mixed suspending substance, and placing polystyrene foam particles of 0.5 times of the above-formulated parts of weight in the stirring container, with stirring being continued for 10 min at the rotational speed of 100 r/min, taking out the so-mixed polystyrene foam particles and placing in a baking oven at 50° C. for drying for 20 min to obtain polyethylene foam particles covered with the mixed suspending substance; and S4: placing remaining parts of weight of polystyrene foam particle and the polyethylene foam particles that are covered with the mixed suspending substance obtained in step S3 in an open container, dissolving 1 part of weight of water-soluble acrylic acid resin in 0.5 parts of weight of water to form an acrylic acid resin solution, and spraying the acrylic acid resin solution, in the form of a mist, at a stirring condition of 100 r/min, into the open container, rising temperature to 90° C. and continuing stirring for 25 min, and then placing in an airflow dryer for treatment for 30 min, with temperature being set at 100° C., to obtain the organic lightweight aggregate; and a method for manufacturing the porous silicate thermal insulation material 3 comprises the following step:

S5: uniformly mixing the lightweight inorganic matrix obtained in step S2 and the organic lightweight aggregate obtained in step S4 to obtain the porous silicate thermal insulation material.

Comparative Example 1

Comparative Example 1 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| calcium chloride | 8, |
| dodecyl polyoxyethylene ether | 5, and |
| stearic palmitamide | 8; | the organic lightweight aggregate 31 comprises ingredients having parts of weight provided below:

| | |
|---|---|
| microsilica | 30, |
| bentonite | 8, |
| calcium stearate | 18, |
| polystyrene foam particle | 30, and |
| water-soluble acrylic acid resin | 0.5. |

Comparative Example 2

Comparative Example 2 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| calcium chloride | 8, |
| dodecyl polyoxyethylene ether | 5, and |
| stearic palmitamide | 8; | and
the organic lightweight aggregate 31 comprises ingredients having parts of weight provided below:

| | |
|---|---|
| talc powder | 30, |
| 1-chloro-2fluoroethane | 8, |
| calcium stearate | 18, |
| polystyrene foam particle | 30, and |
| water-soluble acrylic acid resin | 0.5. |

Comparative Example 3

Comparative Example 3 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| calcium chloride | 8, |
| dodecyl polyoxyethylene ether | 5, and |
| stearic palmitamide | 8; | and
the organic lightweight aggregate 31 comprises ingredients having parts of weight provided below:

| | |
|---|---|
| talc powder | 30, |
| bentonite | 8, |
| polystyrene foam particle | 30, and |
| water-soluble acrylic acid resin | 0.5. |

Comparative Example 4

Comparative Example 4 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| sodium chloride | 8, |
| dodecyl polyoxyethylene ether | 5, and |
| stearic palmitamide | 8; | and
the organic lightweight aggregate 31 comprises ingredients having parts of weight provided below:

| | |
|---|---|
| polystyrene foam particle | 30, and |
| water-soluble urea-formaldehyde resin | 0.5. |

Comparative Example 5

Comparative Example 5 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |

-continued

| | |
|---|---|
| calcium chloride | 8, |
| dodecyl polyoxyethylene ether | 5, and |
| stearic, palmitamide | 8; | and the organic lightweight aggregate 31 comprises an ingredient having parts of weight provided below:

| | |
|---|---|
| polystyrene foam particle | 30. |

Comparative Example 6

Comparative Example 6 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| calcium chloride | 8, |
| dodecyl polyoxyethylene ether | 5, and |
| stearic, palmitamide | 8; | and the organic lightweight aggregate 31 comprises ingredients having parts of weight provided below:

| | |
|---|---|
| polyurethane foam particle | 30, and |
| water-soluble acrylic acid resin | 0.5. |

Comparative Example 7

Comparative Example 7 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| dodecyl polyoxyethylene ether | 5, and |
| stearic palmitamide | 8; | the organic lightweight aggregate 31 comprises ingredients having parts of weight provided below:

| | |
|---|---|
| polystyrene foam particle | 30, and |
| water-soluble acrylic acid resin | 0.5. |

Comparative Example 8

Comparative Example 8 of the present invention provides an energy-saving building system using porous silicate material for thermal insulation, which is generally similar to Embodiment 7, with a difference being that the Embodiment provides a specific definition of the lightweight inorganic matrix and the organic lightweight aggregate. The lightweight inorganic matrix 32 is mainly formed of ingredient materials having parts of weight provided below:

| | |
|---|---|
| calcium silicate | 25, |
| aluminum silicate | 15, |
| calcium chloride | 8, |
| dodecyl polyoxyethylene ether | 5, and |
| stearic palmitamide | 8; | and the organic lightweight aggregate 31 comprises ingredients having parts of weight provided below:

| | |
|---|---|
| polystyrene foam particle | 30, and |
| water-soluble urea-formaldehyde resin | 0.5. |

Test Example 1: Stretching Bonding Strength Test

The porous silicate thermal insulation materials of Embodiments 7-9 and Comparative Examples 1-3 are cast to make thermal insulation plates having a thickness of 0.5 cm. The thermal insulation plate of each group is placed in room temperature water for soaking for 90 h, and stretching bonding strength is measured before and after soaking for 90 h for the thermal insulation plate of each group. The result is shown in Table 1.

TABLE 1

Result of tests for thermal insulation plates made of each porous silicate thermal insulation material

| | Stretching Bonding Strength | |
|---|---|---|
| Group | before soaking | After soaking for 90 h |
| Embodiment 7 | 2.15 | 1.36 |
| Embodiment 8 | 2.47 | 1.68 |
| Embodiment 9 | 2.23 | 1.39 |
| Comparative Ex. 1 | 2.01 | 0.64 |
| Comparative Ex. 2 | 2.08 | 0.62 |
| Comparative Ex. 3 | 1.94 | 0.55 |

Table 1 reveals thermal insulation plates made of the porous silicate thermal insulation materials of Embodiments 7-9 still have a stretching bonding strength greater than 1.3 Mpa even after soaking for 90 h, while the porous silicate thermal insulation materials of Comparative Examples 1-3, which have a stretching bonding strength slightly lower than that of Embodiments 7-9, have a stretching bonding strength dropping to below 0.7 Mpa after soaking for 90 h. This evidences the porous silicate thermal insulation material made of the materials provided in the present invention is effective in overcoming issues of moisture absorption and deformation existing in thermal insulation plates.

Test Example 2: Performance Inspection Tests for Thermal Insulation Plate Made of Each Porous Silicate Thermal Insulation Material Thermal insulation plates made of the porous silicate thermal insulation materials of Embodiments 10-12 of the present invention and Comparative Examples 4-8 are provided for measurement of thermal conductivity, compressive strength, and strength after being frozen (placed in a −25° C. environment for 10 d), an average being taken and standard deviation being calculated. The result of measurement is shown in Table 2.

TABLE 2

Results of measurement for performance of thermal insulation plate of each porous silicate thermal insulation material

| Group | Thermal Conductivity (W/m · K) | Compressive Strength (MPa) | Compressive Strength after Freezing (MPa) |
|---|---|---|---|
| Embodiment 10 | 0.016 | 74.4 | 72.9 |
| Embodiment 11 | 0.011 | 83.5 | 82.7 |
| Embodiment 12 | 0.013 | 79.6 | 77.8 |
| Comparative Ex. 4 | 0.085 | 59.6 | 43.6 |
| Comparative Ex. 5 | 0.074 | 64.9 | 57.5 |
| Comparative Ex. 6 | 0.081 | 50.5 | 38.7 |
| Comparative Ex. 7 | 0.127 | 49.5 | 35.6 |
| Comparative Ex. 8 | 0.156 | 42.8 | 32.7 |

Table 2 reveals that the thermal insulation plates made of the porous silicate thermal insulation materials provided in Embodiments 10-12 of the present invention provides have relatively low thermal conductivities and relatively high compressive strengths, and the strengths after being frozen in a −25° C. environment for 10 d is still significantly greater than those of the porous silicate thermal insulation materials of Comparative Examples 4-8.

The embodiments discussed above are only provided for illustration of preferred embodiments of the present invention and are not intended to limit the scope of the present invention. Variations and modifications that persons having ordinary skill in the art may contemplate, without departing the inventive sprit of the present invention, by following the technical solution of the present invention are considered falling in the scope of protection of the present invention sought with the appended claims.

What is claimed is:

1. An energy-saving building system using porous silicate material for thermal insulation, comprising:
a foundation (1) comprising a ground ring beam (11) and columns (12) disposed on the ground ring beam (11), wherein the porous silicate thermal insulation material (3) is cast around the ground ring beam (11) and the columns (12), the porous silicate thermal insulation material (3) is formed of an organic lightweight aggregate (31) and a lightweight inorganic matrix (32), the organic lightweight aggregate (31) is arranged in an interior of the lightweight inorganic matrix (32), and the lightweight inorganic matrix (32) is formed with a plurality of micropores (33);
a retaining wall body comprising an outer wall (4) disposed on the ground ring beam (11), wherein the outer wall (4) is formed of an outer side support body (41), an inner side support body (42), and the porous silicate thermal insulation material (3) cast between the outer side support body (41) and the inner side support body (42), the outer side support body (41) and the inner side support body (42) are connected by a heat insulating connection member (43) arranged therebetween; and
a roof system (2) comprising a roof support beam (21) disposed atop the outer wall (4) and a base layer roof panel (22) disposed on the roof support beam (21), wherein the porous silicate thermal insulation material (3) is cast around the base layer roof panel (22), the porous silicate thermal insulation material (3) cast around the base layer roof panel (22) is connected with the porous silicate thermal insulation material (3) cast between the outer side support body (41) and the inner side support body (42), and the porous silicate thermal insulation material (3) is cast on an annular intersection between an outer side of the outer wall (4) and the foundation (1).

2. The energy-saving building system using porous silicate material for thermal insulation according to claim 1, wherein the ground ring beam (11) comprises an outer supporting ring beam (111) and an inner supporting ring beam (112) arranged inside the outer supporting ring beam (111), a gap being formed between the inner supporting ring beam (112) and the outer supporting ring beam (111) and filled up with the porous silicate thermal insulation material (3); the base layer roof panel (22) comprises an inner ring (222) and an outer ring (223) arranged at one side of the inner ring (222), the inner ring (222) and the outer ring (223) being connected by a connecting member (221) arranged therebetween, the inner side support body (42) having a lower end disposed on the inner supporting ring beam (112) and an upper end extending through the porous silicate thermal insulation material (3) to connect to the inner ring (222), the outer side support body (41) having a lower end disposed on the outer supporting ring beam (111) and an upper end extending through the porous silicate thermal insulation material (3) to connect to the outer ring (223).

3. The energy-saving building system using porous silicate material for thermal insulation according to claim 1, wherein the inner side support body (42) has a lower end disposed on the ground ring beam (11) and an upper end extending through the porous silicate thermal insulation material (3) to be fixed to the base layer roof panel (22), a channel steel (5) being fixedly connected to an outer side of the ground ring beam (11) by a spacing support beam or a bridge-cut bolt, and the outer side support body (41) has a lower end fixed to the channel steel (5) and an upper end fixed to a separately supported eaves or balcony.

4. The energy-saving building system using porous silicate material for thermal insulation according to claim 1, wherein the ground ring beam (11) is directly constructed on a sand/gravel base and a bottom of the ground ring beam (11) and a top of the ground ring beam (11), with a part thereof connected with the columns (12) being excluded, are provided with the porous silicate thermal insulation material (3).

5. The energy-saving building system using porous silicate material for thermal insulation according to claim 1, wherein the foundation (1) further comprises support pillars (13) formed on a sand/gravel base to support the ground ring beam (11), the support pillars (13) being ring beam legs or separate pillars, and a top of the ground ring beam (11), with a part thereof connected with the columns (12) being excluded, side surfaces of the support pillars (13), and a bottom of the ground ring beam (11), with a part thereof connected with the support pillars (13) being excluded, are provided with the porous silicate thermal insulation material (3).

6. The energy-saving building system using porous silicate material for thermal insulation according to claim 1, wherein the outer wall (4) is mounted with an external door/window frame (6) for mounting an internal door/window frame (7), the external door/window frame (6) being formed as being circumferentially surrounded by four heat insulating plates (61) that are fixed to the porous silicate thermal insulation material (3), each of the heat insulating plates (61) and two opposite end faces of the external door/window frame (6) being provided with two waterproof plastic rubber strip layers (62) for fixing the external door/window frame (6), the two waterproof plastic rubber strip layers (62), the external door/window frame (6), and the internal door/window frame defining therebetween a hollow compartment (63), each of the heat insulating plates (61) being formed with a circular hole (64) in communication with the hollow compartment (63), the hollow compartment (63) and the circular hole (64) being filled up with a porous silicate thermal insulation material (3).

7. The energy-saving building system using porous silicate material for thermal insulation according to claim 1, wherein the lightweight inorganic matrix (32) is mainly formed of ingredient materials having the following parts of weight: calcium silicate 20-30, aluminum silicate 10-20, calcium chloride 5-10, dodecyl polyoxyethylene ether 2-8, and stearic palmitamide 5-10.

8. The energy-saving building system using porous silicate material for thermal insulation according to claim 7, wherein the organic lightweight aggregate (31) comprises ingredients having the following parts of weight: talc powder 25-35, bentonite 5-10, calcium stearate 15-20, polystyrene foam particle 20-40, and water-soluble acrylic acid resin 0.1-1.

9. The energy-saving building system using porous silicate material for thermal insulation according to claim 8, wherein a method for manufacturing the lightweight inorganic matrix (32) comprises the following steps: S1: providing 5-10 parts of weight of calcium chloride, 2-8 parts of weight of dodecyl polyoxyethylene ether, and 5-10 parts of weight of stearic palmitamide, adding water of two times of the parts of weight, stirring with a stirrer at a rotational speed of 20-100 r/min to form a porous foam; and S2: uniformly mixing 10-20 parts of weight of aluminum silicate and 20-30 parts of weight of calcium silicate with the porous foam formed in step S1, adding water of 20-30 parts of weight and stirring at a speed of 20-100 r/min for 5-10 min for expanding and foaming in room temperature for 1-10 min to obtain the lightweight inorganic matrix.

10. The energy-saving building system using porous silicate material for thermal insulation according to claim 8, wherein a method for manufacturing the organic lightweight aggregate (31) comprises the following steps: S3: placing 25-35 parts of weight of talc powder and 15-20 parts of weight of calcium stearate in a stirring container, adding 5-10 parts of weight of bentonite for stirring at a rotational speed of 20-100 r/min for 5-15 min to obtain a mixed suspending substance, placing polystyrene foam particles of 0.5 times of the formulated parts of weight in the stirring container, with stirring being continued at the rotational speed of 20-100 r/min for 1-10 min, taking out the so-mixed polystyrene foam particles and placing in a baking oven at 40-50° C. for drying for 10-20 min to obtain polyethylene foam particles covered with the mixed suspending substance; and S4: placing remaining parts of weight of polystyrene foam particle and the polyethylene foam particles that are covered with the mixed suspending substance obtained in step S3 in an open container, dissolving 0.1-1 parts of weight of water-soluble acrylic acid resin in 0.05-0.5 parts of weight to form an acrylic acid resin solution, spraying the acrylic acid resin solution, in the form of a mist, at a stirring condition of 20-100 r/min, into the open container, rising temperature to 80-90° C., continuing stirring for 15-25 min, and then placing in an airflow dryer for treatment for 30 min, with temperature being set at 100° C., to obtain the organic lightweight aggregate.

\* \* \* \* \*